Nov. 8, 1966 A. F. BROOK 3,284,078
COMBINATION FOLDING AND PUNCHING MACHINE
Filed Aug. 31, 1964 9 Sheets-Sheet 1

INVENTOR.
ARTHUR F. BROOK
BY
Philip S. McBean
ATTORNEY

Nov. 8, 1966   A. F. BROOK   3,284,078
COMBINATION FOLDING AND PUNCHING MACHINE
Filed Aug. 31, 1964   9 Sheets-Sheet 2

Fig. 2.

INVENTOR.
ARTHUR F. BROOK
BY
Philip S. Bean
ATTORNEY

Nov. 8, 1966  A. F. BROOK  3,284,078
COMBINATION FOLDING AND PUNCHING MACHINE
Filed Aug. 31, 1964  9 Sheets-Sheet 6

Fig.6.

INVENTOR.
ARTHUR F. BROOK
BY
Philip S. McLean
ATTORNEY

Nov. 8, 1966  A. F. BROOK  3,284,078
COMBINATION FOLDING AND PUNCHING MACHINE
Filed Aug. 31, 1964  9 Sheets-Sheet 7

INVENTOR.
ARTHUR F. BROOK
BY
ATTORNEY

Nov. 8, 1966  A. F. BROOK  3,284,078
COMBINATION FOLDING AND PUNCHING MACHINE
Filed Aug. 31, 1964  9 Sheets-Sheet 8

INVENTOR.
ARTHUR F. BROOK
BY
ATTORNEY

Fig. 14

INVENTOR.
ARTHUR F. BROOK

United States Patent Office 3,284,078
Patented Nov. 8, 1966

3,284,078
COMBINATION FOLDING AND PUNCHING MACHINE
Arthur F. Brook, 140 S. Hamilton St., Poughkeepsie, N.Y.
Filed Aug. 31, 1964, Ser. No. 393,174
10 Claims. (Cl. 270—82)

The invention herein disclosed relates to the folding and the punching of folded sheets, such as sheets to form the covers of wire-bound books and the like.

Objects of the invention are to effect the folding of sheets or blanks, for example into the form of book covers, and the punching then of such covers to receive the binding wires, all in one continuous operation, on the same, single machine and without any intermediate handling or other interruption.

Further special objects of the invention are to automatically supply the blanks as needed, to accomplish sure separation and feeding of individual blanks and to stack the covers, after folding and punching, in orderly relation ready for subsequent use.

Other important objects of the invention are to accomplish all the foregoing and other desirable objects in a machine of simple practical and reasonable cost construction.

The foregoing and other desirable objects are accomplished by novel features of construction, combinations and relations of parts all as hereafter illustrated and described.

The drawings accompanying and forming part of this specification show in preferred form a present embodiment of the invention, but it will be understood that structure may be modified and changed as regards the immediate illustration all within the true intent and scope of the invention as hereafter defined and claimed.

FIG. 8-A is a broken cross sectional detail on substantially the plane of line 8A—8A of FIG. 8 showing relatively separable feeding out rollers.

Figures 1, 1A, 1B, 1C:
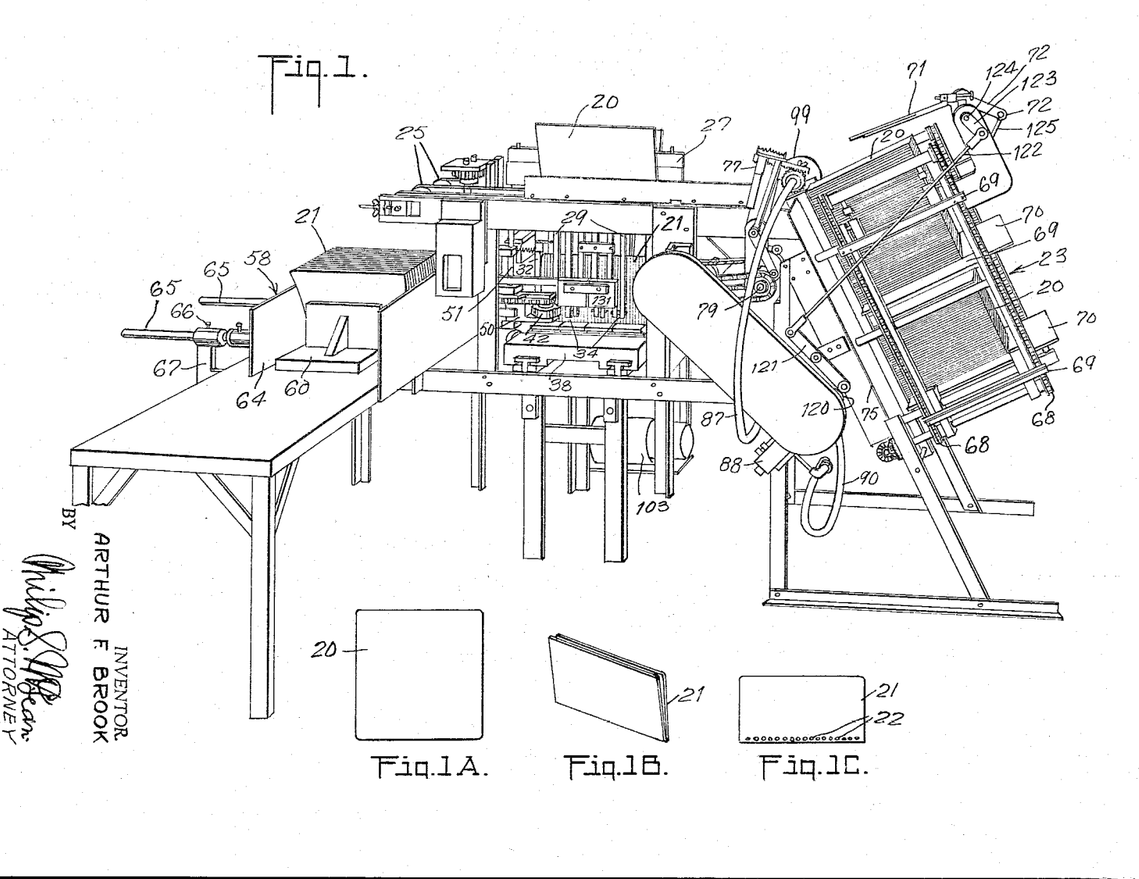
FIG. 1 is a perspective view looking at the back of the machine with the elevator for the blanks appearing at the right and the stacker for the folded and punched sheets at the left.
FIG. 1A is a plan view of one of the blank sheets.
FIG. 1B is a perspective view of the folded sheet.
FIG. 1C is a face view of a folded and punched sheet.

FIGS. 1A, 1B and 1C are first referred to as illustrating the product of the machine, from a sheet 20 fed in at one end of the machine, folded for instance to form a book cover 21 and then perforated along the folded edge as at 22 to receive the wire for binding the cover and inserted leaves into book form.

Figure 2:
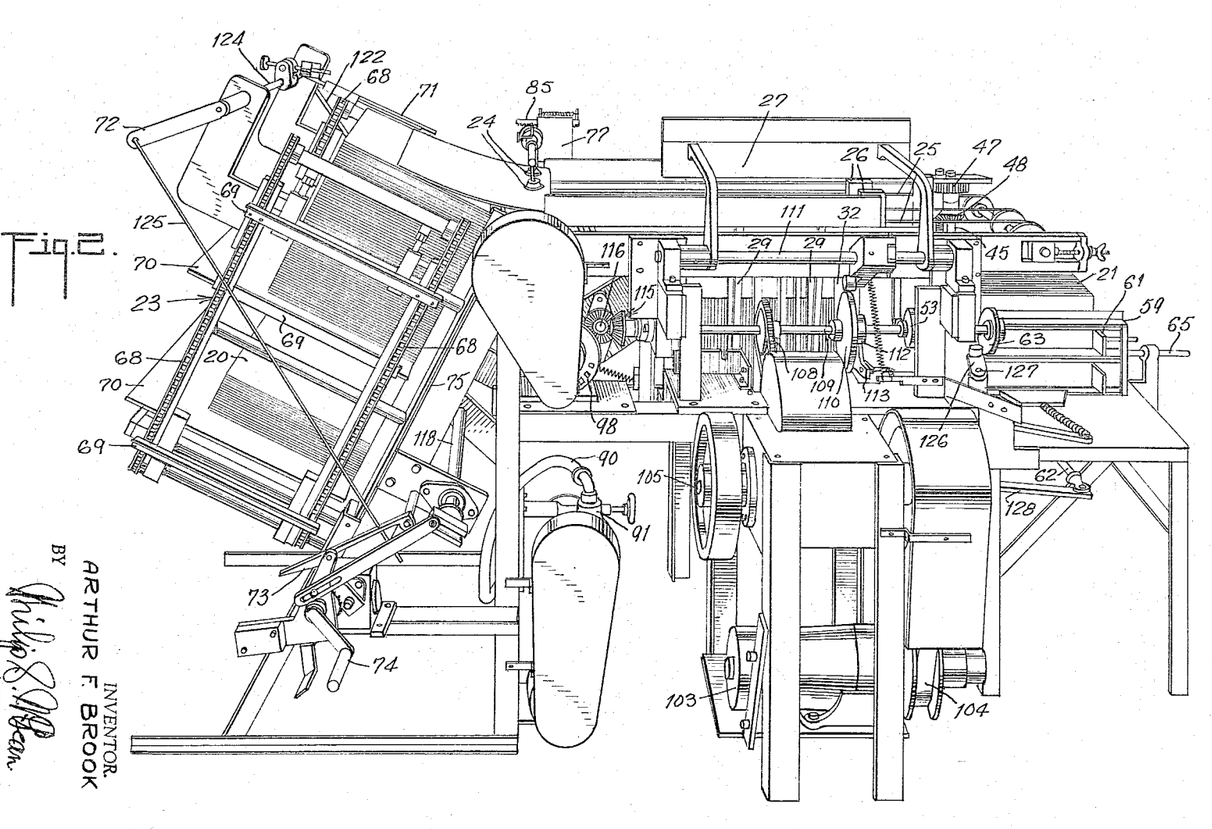
FIG. 2 is a perspective view on a slightly larger scale of the opposite or what may be considered the front side of the machine with the elevator at the left and the stacker at the right.
Figure 7:
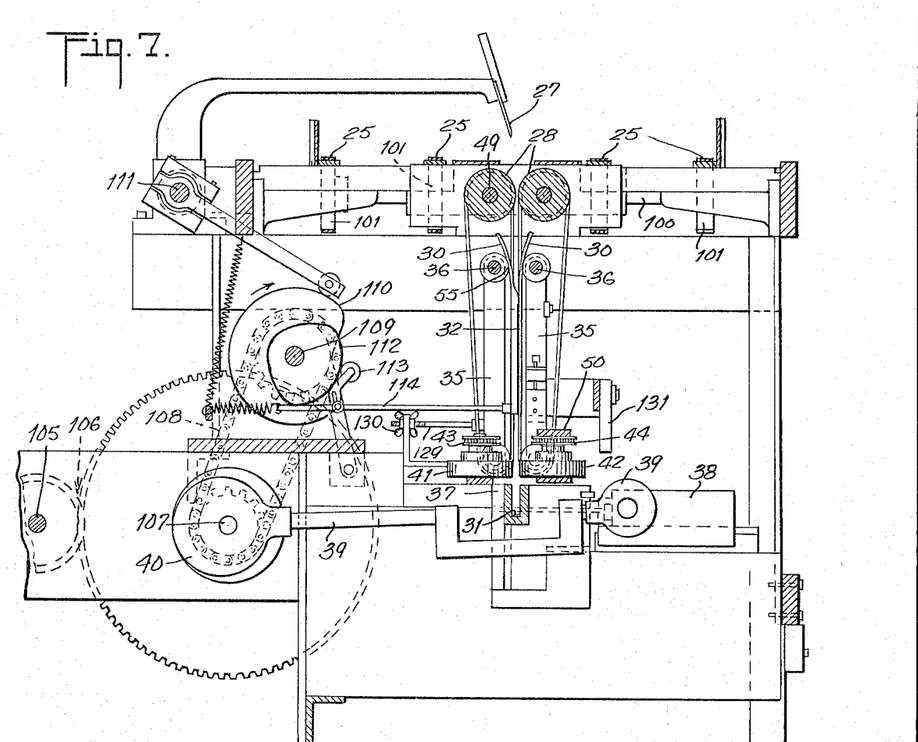
FIG. 7 is a broken cross sectional view on substantially the plane of line 7—7 of FIG. 4 showing in particular parts of the folding and feeding out mechanism.

Stacks of the sheets or blanks are raised by a chain elevator 23 at one end of the machine to suction cups at 24, FIG. 2, which lift off the top sheet and deposit it on tapes 25 which convey it up against front stops 26, beneath a folded blade 27 which drives it down between opposed folding rollers 28, FIG. 7.

The blank, as it is folded, is taken by companion down feeding tapes 29 running down over these rollers, between guides 30 down into a shallow guide trough 31 which locates the folded edge at the proper level for punching the binder perforations.

Figure 5:
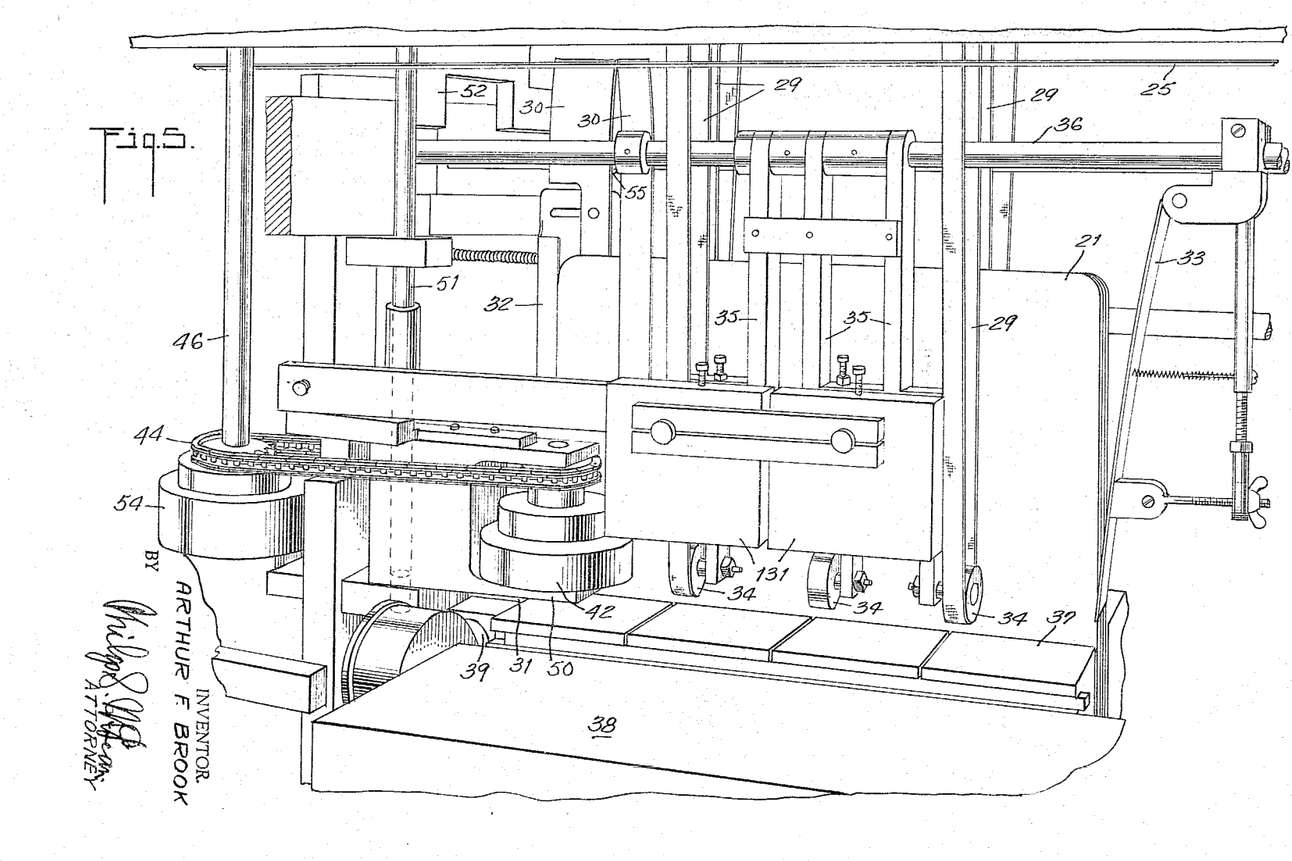
FIG. 5 is a broken perspective view illustrating a blank fed from the folder down into position in the punch.

In this location, the folded blank or cover is positioned longitudinally between the top and bottom edge guides or stops 32, 33, FIG. 5.

The down feeding conveyor belts or tapes 29 are carried by pulleys 34 at the bottom mounted on swinging frames 35, hung from supporting shafts 36 FIGS. 5 and 7 so that they may carry the down feeding tapes against a folded blank for downward movement and then release the down feeding pressure to permit the folded blank, after punching, to be shifted longitudinally out of the punch to the stacker which collects the finished covers.

The punch as shown in FIG. 7 is made up of a stationary bed 37 carrying the dies and a punch head 38 carrying the companion punch elements and reciprocated by links 39 operated from eccentrics 40.

Figure 6:
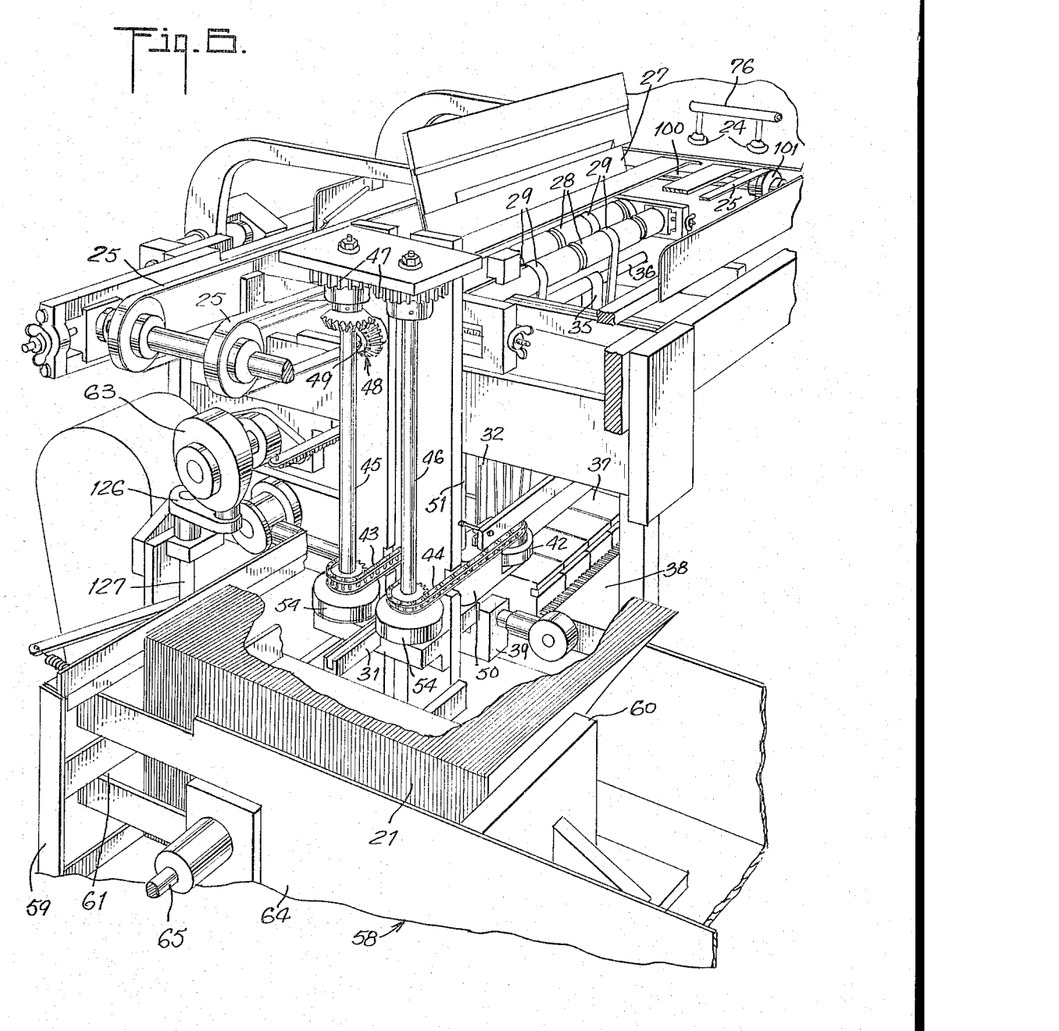
FIG. 6 is a broken perspective view illustrating in particular the feed rolls and guide for removing the blank from the punch and feeding it out to the stacker.

Removal of the perforated blanks or covers from the punch mechanism is effected in the illustration by companion feed rollers 41, 42, driven by chain gearing 43, 44 from spaced upright shafts 45, 46, FIG. 6.

These shafts are geared together at the top at 47, FIG. 6 and one shaft driven by bevel gearing 48 from the horizontal roll carrying shaft 49.

Figure 8:
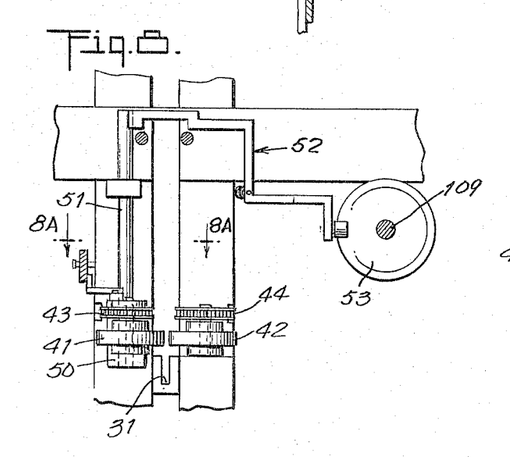
FIG. 8 is a similar view but looking in the opposite direction as indicated by arrows 8—8 in FIG. 4.
Figure 8A:
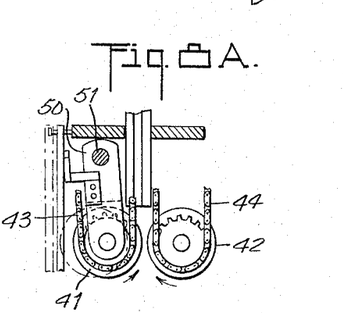

One of the feeding out conveyor rolls, the roll 42 in this instance, is mounted for movement toward and away from the companion roll by being journalled on a swinging arm 50, FIGS. 8, 8A, mounted to swing about a center 51 under control of leverage system 52 actuated from cam 53.

The feeding out action is completed by companion rollers 54 on the lower ends of shafts 45, 46 engaging opposite sides of the folded and perforated blanks started by rollers 41, 42 and propelled by them into the grip of rollers 54.

At such time the front or upper edge stop 32, FIG. 5, which is pivoted at 55, is swung out of the path of the blank by a cam 112 operating through connections 113, 114, FIG. 7.

Figure 4:
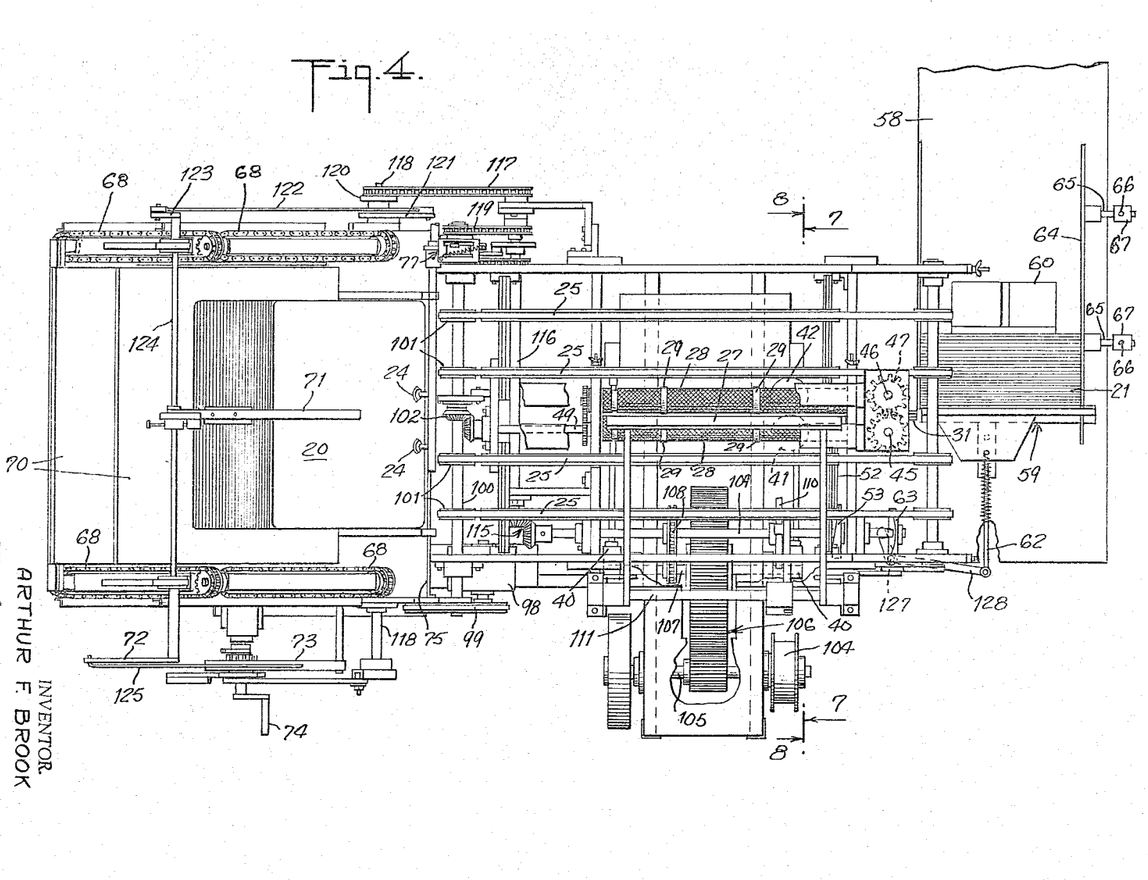
FIG. 4 is a top plan view of the machine with the elevator at the left and the stacker at the right, the latter shown broken away.

The stacker for the completed products is shown in the form of a box-like channel 58, FIGS. 1 and 6, lined up transversely with the bottom guide 31, FIG. 4, and having a reciprocating packer head 59 for stacking the folded pieces 21 against a confining slide 60.

The reciprocating head 59 of the stacker is shown as guided in slots 61 in the sides of the receiving channel 58 and as actuated through connections 62 from a cam 63, FIGS. 4 and 6.

FIG. 4 shows how the outer side wall 64 of the stacker may be carried by rods 65 adjustably held by set screws 66 in supports 67 to match the length or height of the folded covers.

The slots 61 in the sides of the stacker permit operation of the packer head in the various settings of the movable stacker wall 64.

The elevator mechanism is shown in FIGS. 1, 2 and 4 made up of endless chains 68 geared together to operate in unison and having opposed upward travelling runs carrying opposed angle irons 69 to support insertable plates or pallets 70 carrying stacks of the flat blanks 20, this structure being inclined from the vertical toward the outer end of the infeeding conveyor 25.

A feeler 71 positioned to engage the topmost blank controls through connections 72, FIG. 2, a reciprocating pawl 73 for raising the elevator by increments to meet the infeeding requirements of the machine.

In this same view, a hand crank is shown at 74 for setting the elevator at the proper level at the start or under other operating conditions of the machine.

The infeeding edges of the blanks are positioned at the top of the elevator by resting against an inclined gauge plate 75, FIG. 1 and the vacuum cups 24 are operated to pick up the top sheet, force it back slightly to effect separation and then lift it over this gauging barrier and present it to the infeeding conveyor tapes.

FIGS. 1 to 4 and 9 through 12 illustrate this picker operation.

Vacuum cups 24 are supported in dependent relation on a tubular shaft 76 journalled in a head structure 77 guided to slide over an upstanding supporting arm 78 pivoted on horizontal shaft 79 and oscillated by angularly extending lever 80 carrying roll 81 engaged with cam 82.

Vertical movement of the sliding head 77 is effected by cam roll 83 on that head riding on the cam 84.

Rotary movement of the suction cups is effected by rack 85 sliding transversely in the supporting head and engaging pinion 86 on the tubular shaft carrying the suction cups.

Figure 3:
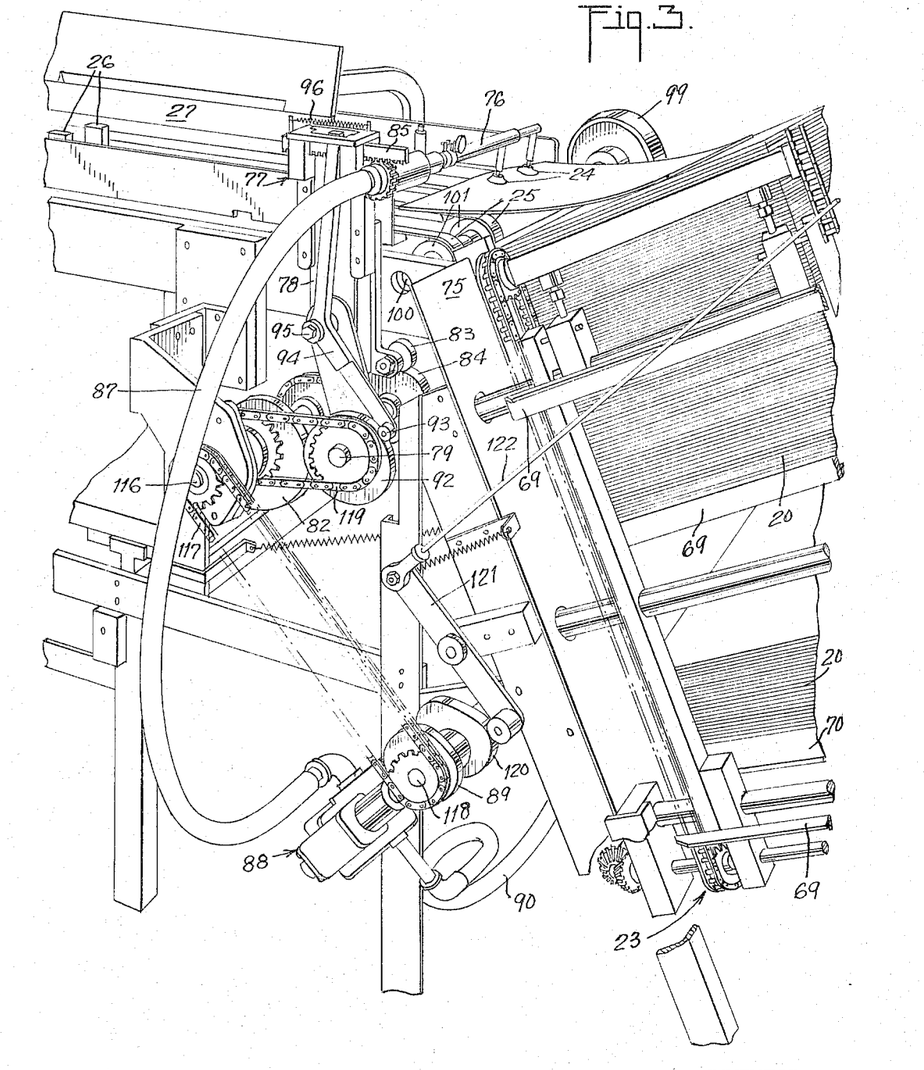
FIG. 3 is a further enlarged broken perspective view illustrating in particular the vacuum cups for separating and lifting the top sheet off the pile of sheets on the elevator and onto conveyor belts carrying the blank to the folder.

This tubular shaft 76 is connected by hose 87 with vacuum valve gear 88, FIG. 3 operated from cam 89, with suction applied by hose 90 extending from motor driven vacuum pump indicated at 91, FIG. 2.

The inward inclination of the elevator 23 gives the stacks of blanks thereon a forward pitch, squarely against the correspondingly inclined front gauge or stop wall 75.

Figure 9:
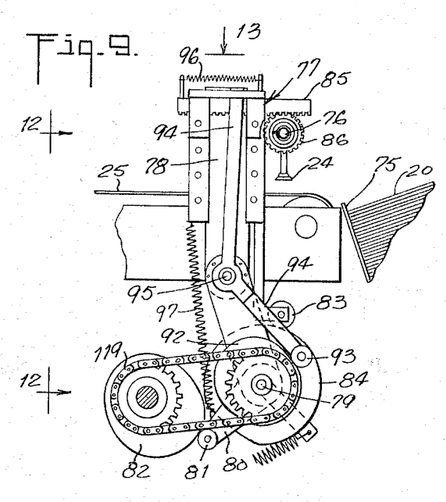
FIGS. 9, 10 and 11 are detail part sectional views illustrating arrangement and operation of the suction cups which lift the sheets from the supply stack on the elevator on to the infeeding conveyor.

FIG. 9 shows the suction cups 24 in the elevated, rest position above the infeeding conveyor tapes 25.

Figure 10:
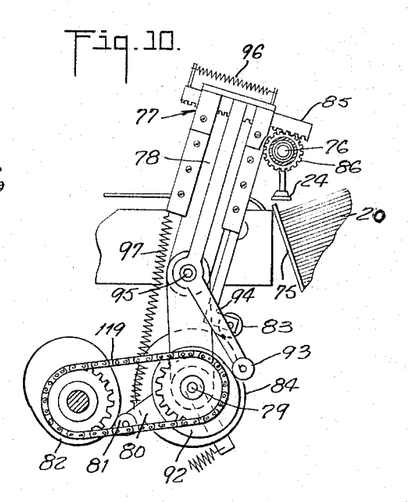

FIG. 10 shows the pickers swinging inwardly toward the elevator under control of cam 82, lowering toward the stack of blanks under control of cam 84 and rotating left handedly to place them over the stack under control of a cam 92 in engagement with a roll 93 on lever 94 pivoted at 95 on the swinging arm 78 and engaging the rack 85 at its upper end.

A spring 96 connected with the rack applies tension to hold the cam follower 93 in engagement with cam 92 and a spring 97 connected with lever arm 80 and with the sliding head 77 serves to hold cam followers 81 and 83 in engagement with their respective cams 82 and 92.

Figures 11, 12, 13:
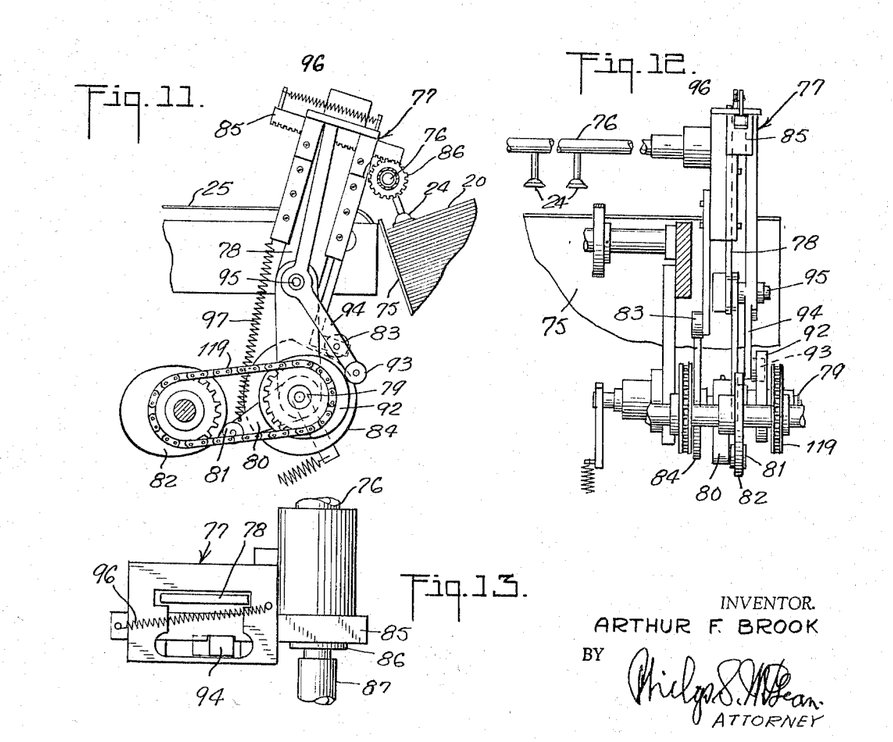
FIG. 12 is a sectional detail on substantially the plane of line 12—12 of FIG. 9.
FIG. 13 is a broken part sectional view of the picker mechanism on substantially the plane of line 13—13 of FIG. 9.

FIG. 11 shows the pickers lowered to the full extent and in engagement with the top sheet, causing them by reason of the inclination of the swinging supporting arm 78, to force the top sheet slightly downward and away from the front stop 75 to effect displacement and separation of the top sheet from the underlying body of the stack.

Then with lifting movement of the sliding head under control of cam 84, the suction cups will lift the top sheet over the edge of the front stop 75 and in a rising and outwardly swinging movement carry the top sheet up over the end of the infeeding conveyor, as indicated in FIGS. 2 and 3.

The suction control valve 88 and actuating cam 89 are timed to apply suction when the cups are lowered down over the stack and to release suction when the cups have lifted the top sheet and carried it inward over the infeeding conveyor 25.

The tapes forming the infeeding conveyor 25, and the take-away rolls 41, 42 and 54, 54 are all driven in synchronized constant speed relation from a single motor 98, FIGS. 2 and 4, belt connected at 99 to the cross shaft 100 carrying pulleys 101 for the outer ends of the tapes and connected by the bevel gearing 102 to the longitudinally extending roll carrying shaft 49, which drives the upright take-away roll shaft 45.

A third motor 103, FIGS. 2 and 4, operates by belt drive 104, a fly wheel shaft 105, geared at 106, to a shaft 107 carrying the eccentrics 40, FIG. 7, for operating the punch.

A sprocket and chain drive connection 108 operates a parallel shaft 109 from shaft 107, shaft 109 carrying one cam 110 for rocking the shaft 111 carrying the folder blade and the cam 112 for swinging the pivoted lever 113 connected by link 114 to swing the front stop 32 out of the way of the folded and punched blank.

Shaft 109, through bevel gearing 115, FIG. 4, drives a cross shaft 116, connected through chain gearing 117 to operate the cam shaft 118 and by chain gearing 119, FIG. 3, to operate the pickup mechanism.

A cam 120 on cross shaft 118, FIG. 3, operates a rock lever 121 which is connected by link 122 with a rock arm 123, FIG. 1, on one end of the shaft 124 carrying the feeler lever 71.

The opposite end of this shaft as shown in FIG. 2, carries the lever 72 which is connected by link 125 with the pawl 73 for operating the elevator.

The feeler is thus made to sense the top of the pile and to lower the pawl into active engagement with the ratchet feed as the stock is lowered by removal of the top sheets.

The cam 63 for operating the stacker is shown in FIGS. 2, 4 and 6 as mounted on the end of shaft 109 and as actuating rock lever 126 on the upper end of shaft 127 which carries at the lower end a lever 128 connected by link 62 with the pusher head 59.

Accurate alignment of the several punch elements with the die is effected in the present illustration by constructing the die as in copending patent application Ser. No. 398,364 with slightly oversize openings for the individual punches and by facing this basic die structure with an overlaying layer of hardened sheet steel held in place by an overlying clamp and which after installation is pierced by the individual punch elements to form the actual die cavities.

Thus the die in the first place is made to exactly fit the punches which it is to receive and by means of a sheet metal facing which can be readily replaced when worn or injured and with the advantage that after replacement the new die seats will be exactly fitted to the companion punches.

By the means shown and described, the parts are timed, coordinated and controlled so that as sheets are taken off the top of the supply stack the elevator will lift the stack to a point within the reach of the suction cups, which will lower to separate and then rise to lift the top sheet over the edge of the inclined front stop and sheet separator 75 and on to the infeeding conveyor tapes 25 shown in FIG. 3, which tapes will then carry the sheet into position beneath the folder blade 27 so that the latter can then drive the sheet downward between the folder rolls 28, FIG. 7, into the grasp of the downfeeding tapes 29, between front and back stops 32, 33, FIG. 5, into position for the punch 37, 38 to perforate the folded stock as in FIG. 1C and whereupon after the front stop 32 is shifted to one side, the outfeeding rolls 41, 42 grip and feed the finished product into the grasp of rolls 54—54, FIG. 6, which advance the folded and perforated piece out in front of the packer 59, FIG. 4, which adds this last folded piece to the group being accumulated in the stacker 58.

The hanging swinging frames 35 carrying the downfeeding tapes 29, FIGS. 5 and 7, are shown as relatively adjustable for effecting the desired gripping and releasing operations.

Thus the frame 35 at the left in FIG. 7 is adjustable by means of link 129 and set screws 130 and the frame at the right is weighted at 131 to swing toward the adjustably positioned set of downfeeding tapes.

The action of the suction cups is unique in that they first effect a separation of the top sheet and then after such separation lift the top sheet and then after such separation lift the top sheet over the front stop and carry it into position over the infeeding conveyor.

Figure 14:
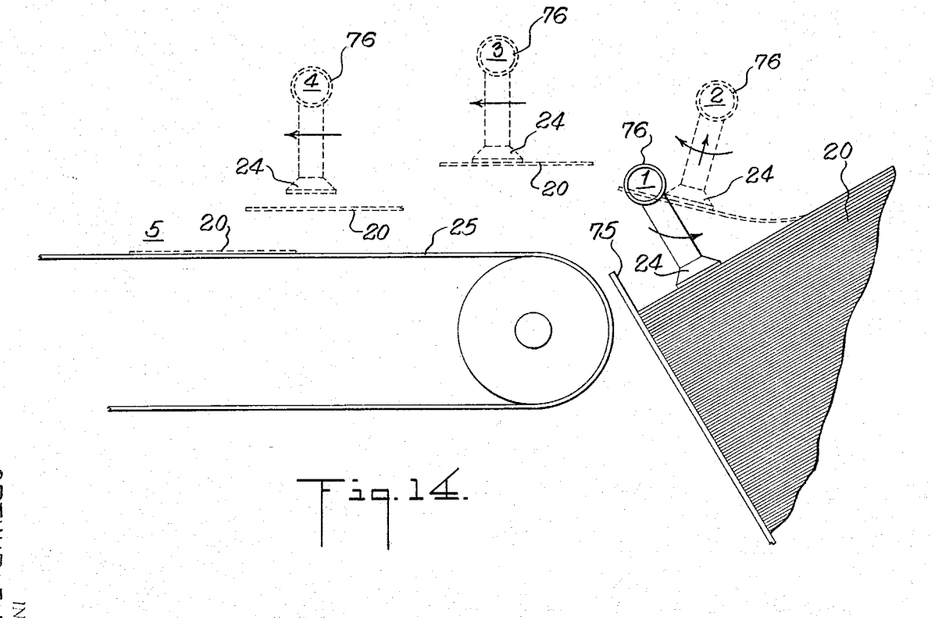
FIG. 14 is a diagrammatic view illustrating the cycle of operation of the vacuum cups which pick up and feed the top sheet off a stack to the infeeding conveyor.

FIG. 14 illustrates diagrammatically four stages in the operation of the pickup.

In the number 1 position, shown in full lines, the suction cups are pressing downward on the top sheet and rotating slightly to bend and slip the top sheet over the stack away from the front stop.

In the number 2 position, the cups have lifted and stripped the top sheet.

In the number 3 position, the cups have lifted the sheet over the front stop 75 and in the following stage, 4, the sheet has been devilered over and dropped on to the conveyor.

The separation and feeding of one sheet or blank at a time is performed with certainty and rapidity.

What is claimed is:

1. A sheet folding and punching machine comprising in combination,
    a punch for perforating the folded edges of folded sheets,
    a folder for folding and delivering the folded edges of said folded sheets to said punch,
    an elevator adjacent said folder for raising a stack of the sheets to be folded and punched,
    sheet feeding means for delivering sheets from the top of the stack on said elevator to said folder, and
    common drive means for synchronizing and operating said parts combined as aforesaid.

2. A sheet folding and punching machine comprising the combination of
    an elevator for a stack of the sheets to be folded and punched,
    sheet conveyor feed tapes in parallel spaced relation extending away from the upper end of said elevator,
    a sheet pickup travelling between the upper end of said elevator and said conveyor tapes and engageable with the topmost sheet of a stack on the elevator for delivering the top sheet from the stack to said conveyor tapes,
    sheet folding guides below and spaced in alignment with the space between said feed tapes,
    a folder blade over and in alignment with the space between said feed tapes and folding guides,
    means for operating said folder blade down between said tapes and guides and for thereby driving a sheet on the tapes between said folding guides,
    a horizontally operating punch below and in alignment with said sheet folding guides, having means for receiving the folded edge of a sheet advanced down between said guides,
    means for operating said punch upon receipt by the same of a folded sheet,
    outfeeding conveyor means for removing a folded and punched sheet from said punch and
    common drive means for synchronizing and operating said parts combined as aforesaid.

3. The invention according to claim 1 with a stacker for the folded and punched sheets having the receiving end of the same in line with the folded sheets in said punch and
    means for transferring folded and punched sheets from said punch to said stacker.

4. The invention according to claim 1 with conveyor means for removing folded and punched sheets from said punch, and
    means for positively feeding folded sheets from said folder down into said punch and
    means for rendering said downfeeding means ineffective when said conveyor means is removing a folded punched sheet from said punch.

5. The invention according to claim 1 with means for feeding folded punched sheets out of said punch,
    means for stopping a folded sheet in definite position in said punch and
    means for removing said sheet stopping means from a folded and punched sheet in said punch on completion of a punch operation.

6. The invention according to claim 1 in which said elevator is inclined upwardly toward said sheet feeding means has a corresponding inclined upright wall adjoining the sheet feeding means for guiding the edges of the stacks which are toward the sheet feeding means and in which
    said sheet feeding means include suction cups engageable with the top sheet of a stack on the elevator and having a downward, rotating and lifting movement to press the leading edge of a top sheet downward away from said inclined guiding wall and to then lift said sheet over the top of said wall.

7. The invention according to claim 1 in which said folder includes spaced companion rolls and a folder blade operating down between said rolls and in which
    conveyor tapes extend over said rolls downward towards said punch and in which,
    said punch includes a trough positioned to receive the folded edge of a sheet advanced downwardly by said conveyor tapes.

8. The invention according to claim 1 with a sheet guiding wall for confining and positioning the edges of a stack of sheets on the elevator and in which
    said sheet feeding means includes an oscillating lever,
    a sliding head mounted on said lever,
    a hollow shaft journalled in said head,
    a suction cup dependent from said shaft for engagement with the top sheet of a stack of sheets on said elevator and
    cam mechanism for rocking said oscillating lever and for shifting said sliding head on said lever and for rocking said hollow shaft carrying the suction cup.

9. The invention according to claim 1 in which
    said elevator comprises
    spaced endless chains having upwardly traveling parallel runs carrying oppositely disposed angle irons, and
    insertable and removable stack carrying pallets seated on said angle irons,
    an upright guide wall positioned for engagement by the inner edges of stacks of sheets on said pallets, and
    said sheet feeding means including suction cups engageable with the top sheets on said stacks, and
    means for rocking and raising said suction cups to separate said top sheets and lift the same over the top of said guide wall.

10. The invention according to claim 1 in which said punch includes
    a trough below and in line with said folder for receiving the folded edge of a sheet delivered by said folder to thereby position the folded edge in said punch, and means for feeding the folded and punched sheets out of the trough of said punch.

References Cited by the Examiner

UNITED STATES PATENTS

| | | | |
|---|---|---|---|
| 1,465,440 | 8/1923 | Houston | 270—80 X |
| 2,176,815 | 10/1939 | Hirohashi | 270—83 |
| 2,775,448 | 12/1956 | Baker et al. | 270—45 |
| 3,193,284 | 7/1965 | Kretz | 270—80 X |

EUGENE R. CAPOZIO, *Primary Examiner.*

N. M. ELLISON, *Assistant Examiner.*